July 2, 1940.  A. KUBITZEK  2,206,196
PHOTOELECTRIC CELL
Filed Nov. 12, 1938  2 Sheets-Sheet 1

Inventor:
Alfred Kubitzek
BY: B. Singer & F. Stern
Attys.

July 2, 1940.  A. KUBITZEK  2,206,196
PHOTOELECTRIC CELL
Filed Nov. 12, 1938   2 Sheets-Sheet 2

Inventor:
Alfred Kubitzek
BY: B. Singer & F. Stern
Attys

Patented July 2, 1940

2,206,196

UNITED STATES PATENT OFFICE 2,206,196

PHOTOELECTRIC CELL

Alfred Kubitzek, Dresden-Laubegast, Germany, assignor to Zeiss Ikon Aktiengesellschaft, Dresden, Germany Application November 12, 1938, Serial No. 240,156
In Germany November 12, 1937

3 Claims. (Cl. 88—23)

This invention relates to improvements in photoelectric cells.

It is an object of the invention to provide a photoelectric cell in which the range of the angle of incident rays of light energizing the cell is limited range.

It has been known to restrict the range of the angle of rays of light adapted to energize a photoelectric element by mechanical or optical means. In the utilization of optical means for limiting the angle of incident rays, it had been proposed heretofore to direct away from the cell by total reflection those rays of light which are outside the desired angle of incidence.

Where mechanical means were provided, they consisted of opaque ribs or projections suitably spaced from each other, and thereby confining the angle of incidence to certain limits.

The optical and mechanical means heretofore used, however, have the disadvantage that the range of the angle of incidence still is excessive. In photographic work this range even though restricted by optical or mechanical means, is greater than the picture angle of the ordinary photographic camera. Hence, the results indicated by the photometer, of which the photoelectric cell forms a part, are frequently not in agreement with the effect of the light inducing the chemical reaction on the sensitized emulsion.

It is an object of the present invention to provide a photoelectric cell in which the range of the angle of incidence of light affecting the cell is limited to a greater degree than it had been feasible heretofore.

It is also an object of the invention to bring about this restriction of the range of the angle of incidence by causing the photoelectric cell to be energized by light which had repeatedly been reflected to strike the cell, while eliminating the influence of all other light by directing it away from the cell.

It is, therefore, also an object of the invention to energize through total reflection a photoelectric cell solely by rays of a predetermined angular inclination to the cell.

The invention also has the object of energizing a photoelectric cell through indirect light and particularly through light which has been subjected to a repeated total reflection.

The invention also has the object of providing in association with a photoelectric cell one or more prisms disposed to the rear of the cell, the prism or prisms preferably being rectangular prisms and being adapted to direct the rays of light from forward of the cell by repeated total reflection to the sensitized layer of the cell averted from the light and protected against ordinary incident light by the carrier of the layer.

With these and numerous other objects in view, embodiments of the invention are described in the following specification and illustrated in the accompanying drawings.

Figure 1:
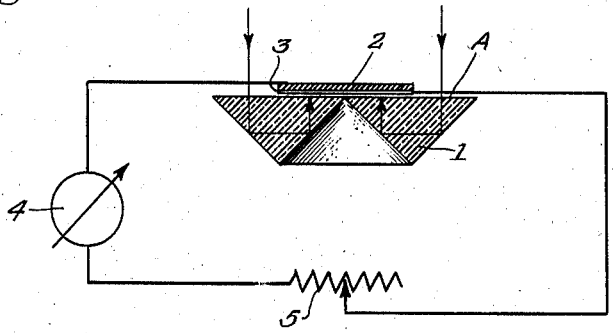
Fig. 1 shows diagrammatically and partly in section a photometer having a photoelectric cell and means for restricting the range of the effective angle of incidence in accordance with the present invention.

In the embodiment illustrated in Fig. 1, an electric photometer is shown diagrammatically. Its cell consists of a carrier or backing 2 with the layer 3 positioned on the rear face of the carrier, which rear face is directed away from the light. The layer 3 is adapted to be electrically influenced by light striking the same, so as for instance to generate a greater or smaller current depending on the intensity of the light. This cell is combined with an electric instrument 4 diagrammatically indicated and of known construction, and with a variable resistance 5 through which the deflection of the instrument 4 may be selectively regulated. Photoelectric meters of this general construction are well known.

The carrier or backing 2 of the sensitized layer 3 is constructed as a plate and the sensitized layer faces the base A of an annular prism 1 disposed in a plane parallel to the carrier 2 and having a right angle as prismatic deflecting angle. This base surface A projects beyond the contour of the cell.

Figure 2:
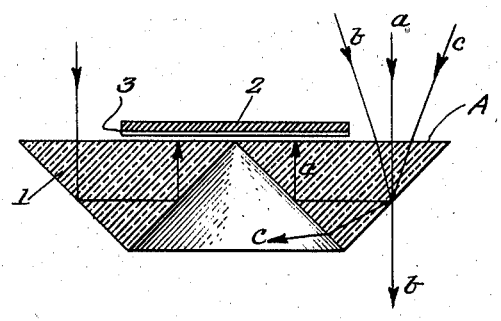
Fig. 2 shows partly in section the photoelectric cell of Fig. 1 with a prism arrangement adapted to direct primarily rays of light against the cell which are at substantially right angle to the plane of the cell.
Figure 3:
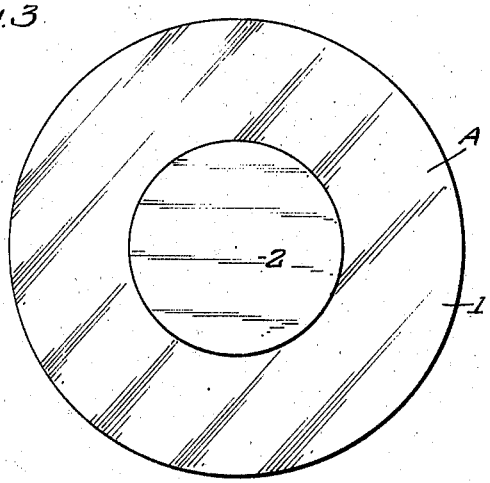
Fig. 3 is a top plan view of an annular prism having a right angle triangular cross-section.

In Figs. 1 and 2, the paths of rays of light entering the base surface A of the prism are indicated. It will be seen that light energizing the layer 3 of the photoelectric cell is twice reflected in the prism 1, provided the rays of light enter the surface A at a substantially right angle thereto. Solely rays of light within a certain range of the angle of incidence can be repeatedly reflected to strike the layer 3. Rays of light striking this surface under different angles, as shown at b and c in Fig. 2, pass through the prism after being suitably refracted, and do not encounter the sensitized layer 3. The ray b, after having struck the base surface A of the prism 1, continues into the air after having passed through the prism, while the rays c are twice reflected within the body of the prism, but continue without encountering the layer 3 of the photoelectric cell. Hence, it is only the rays of light striking the base surface of the conical prism 1 within a certain range of a right angle, or an angle closely related to a right angle, which become effective upon the photoelectric cell, while the other rays are directed away.

Figure 4:
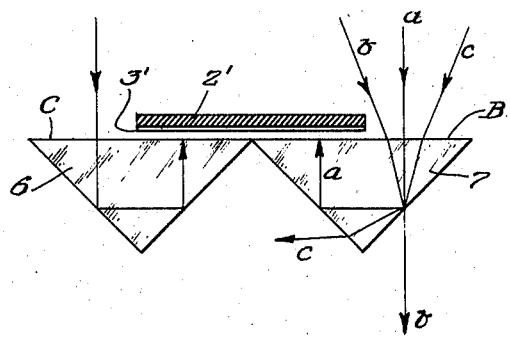
Fig. 4 shows partly in section diagrammatically a photoelectric cell with a pair of prisms adapted to restrict the range of the angle of incidence of energizing light.
Figure 5:
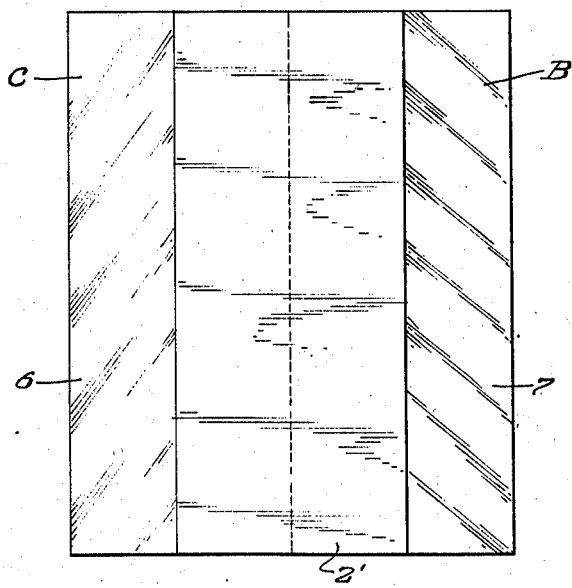
Fig. 5 is a top plan view of the assembly illustrated in Fig. 4.

In the embodiment illustrated in Figs. 4 and 5, the annular conical prism is replaced by two prismatic bars 6 and 7 of triangular cross-section and having a right angle at the apex. These bars 6, 7 are positioned parallel to each other advisably with their bases B, C in a common plane parallel to the plane of the sensitized layer 3' applied to the carrier 2' of the photoelectric cell. The carrier faces forward toward the natural light; the layer 3' faces rearward. Here also the rays of light indicated at a and striking the base B under a right angle (or approximately so) are twice totally reflected to be directed towards the face of the cell averted from the direct light, and protected by the backing 2', while rays b and c striking the base of the prisms under an angle smaller or greater than the said range are deflected away from said cell.

The embodiment illustrated in Figs. 4 and 5 has the advantage that the carrier 2' of the layer 3' may be made in the form of a rectangular plate.

I claim:

1. In combination with a photoelectric cell mounted on the rear face of a carrier plate which protects the cell against light rays striking the front face of said plate, optical means for directing light rays by double total reflection upon said photoelectric cell to energize the same, said optical means being mounted rearwardly of said carrier plate in a position to project beyond the contour thereof so as to be struck by light rays coming from a source forwardly of the front face of said carrier plate, said optical means comprising a prism provided with two reflecting faces angularly positioned with respect to each other and with respect to the plane of said photoelectric cell so that only light rays which enter said prism within a predetermined range of angle of incidence with respect to the plane of said cell are reflected to said photoelectric cell.

2. In combination with a photoelectric cell mounted on the rear face of a circular carrier plate which protects the cell against light rays striking the front face of said plate, an annular right-angle prism positioned with its base adjacent and parallel to said photoelectric cell and projecting beyond the contour of said circular plate so that only light rays entering the prism through the projecting portion of its base within a predetermined range of angles of incidence are twice totally reflected within said prism before they reach said photoelectric cell.

3. In combination with a photoelectric cell mounted on the rear face of a rectangular carrier plate which protects the cell against light rays striking the front face of said plate, a pair of prism bars of right-angle triangular cross-section positioned with their bases adjacent and parallel to said photoelectric cell, said prisms projecting each with one of their longitudinal edge portions beyond two opposed edges of said rectangular carrier plate so that only light rays entering the said prisms through their projecting base portions within a predetermined range of angles of incidence are twice totally reflected within said prisms before they reach said photoelectric cell.

ALFRED KUBITZEK.